(12) United States Patent
Kaufman et al.

(10) Patent No.: US 9,199,567 B1
(45) Date of Patent: Dec. 1, 2015

(54) VEHICLE FLOOR COVER RETENTION DEVICE WITH SPIKED BASE

(71) Applicant: MacNeil IP LLC, Bolingbrook, IL (US)

(72) Inventors: Judd C. Kaufman, Clarendon Hills, IL (US); Allan R. Thom, Burr Ridge, IL (US); Frederick W. Masanek, Jr., Barrington, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 14/671,599

(22) Filed: Mar. 27, 2015

(51) Int. Cl.
*B60N 3/04* (2006.01)
*F16B 5/06* (2006.01)

(52) U.S. Cl.
CPC ................ *B60N 3/046* (2013.01); *B60N 3/044* (2013.01); *F16B 5/0692* (2013.01)

(58) Field of Classification Search
CPC ........ B60N 3/046; B60N 3/044; F16B 5/0692
USPC .................... 296/97.23; 24/586.11
See application file for complete search history.

(56) References Cited

U.S. PATENT DOCUMENTS

| | | | |
|---|---|---|---|
| 1,416,051 A | 5/1922 | Muller | |
| 1,425,006 A | 8/1922 | Goldstein | |
| 1,559,827 A | 11/1925 | Wittman | |
| 1,840,272 A | 1/1932 | Fenton et al. | |
| 2,301,385 A | 11/1942 | Ehrgott | |
| 2,729,019 A | 1/1956 | Breeden | |
| 4,086,679 A * | 5/1978 | Butler | 16/4 |
| 4,392,279 A | 7/1983 | Schwager | |
| 4,561,146 A | 12/1985 | Schaty | |
| 4,562,624 A | 1/1986 | Kanzaka | |
| 4,761,860 A | 8/1988 | Krauss | |
| 4,829,627 A | 5/1989 | Altus et al. | |
| 4,833,760 A | 5/1989 | Sundstrom | |
| 4,878,792 A | 11/1989 | Frano | |
| 4,998,319 A | 3/1991 | Ford | |
| 5,148,581 A * | 9/1992 | Hartmann | 24/351 |
| 5,170,985 A | 12/1992 | Killworth et al. | |
| 5,195,857 A | 3/1993 | Hiramoto | |
| 5,308,671 A | 5/1994 | Wells | |
| 5,362,187 A | 11/1994 | Scalise | |
| 5,400,461 A | 3/1995 | Malish et al. | |
| 5,511,919 A | 4/1996 | Scalise | |

(Continued)

FOREIGN PATENT DOCUMENTS

| | | | |
|---|---|---|---|
| DE | 3142761 A1 | 9/1982 | |
| DE | 3240270 A1 | 5/1984 | |

(Continued)

OTHER PUBLICATIONS

Ebay Vintage Plastic Furniture Coasters Floor Rug Protectors Lot, downloaded from http://www.ebay.com/itm/like/400835847592?lpid=82&chn=ps on Jan. 26, 2015.

(Continued)

*Primary Examiner* — Pinel Romain
(74) *Attorney, Agent, or Firm* — Jefferson Perkins

(57) ABSTRACT

A device for fastening a vehicle floor cover to carpeting in a vehicle foot well. The device includes a body with a first and second face. Projections or spikes extend from the first face and, in one embodiment, each have vertical faces in alignment with mold ejector bars or sleeves. A fastener, sized to be received into a grommet, extends from the second face.

16 Claims, 12 Drawing Sheets

(56) References Cited

U.S. PATENT DOCUMENTS

| | | | |
|---|---|---|---|
| 5,566,430 | A | 10/1996 | Cheng |
| 5,647,107 | A | 7/1997 | Brewster |
| 5,743,506 | A | 4/1998 | Adams |
| 5,775,859 | A | 7/1998 | Anscher |
| 5,950,277 | A | 9/1999 | Tallmadge et al. |
| 6,119,998 | A | 9/2000 | Anselmo |
| D432,904 | S | 10/2000 | Anselmo |
| 6,345,946 | B1 | 2/2002 | Mainini et al. |
| 6,357,090 | B1 | 3/2002 | Murai |
| 6,381,806 | B1 | 5/2002 | Stanesic et al. |
| 6,431,585 | B1 | 8/2002 | Rickabus et al. |
| 6,435,790 | B1 | 8/2002 | Ichikawa |
| 6,497,003 | B2 | 12/2002 | Calabrese |
| 6,568,893 | B2 | 5/2003 | LeVey et al. |
| 6,757,945 | B2 | 7/2004 | Shibuya et al. |
| 6,840,488 | B2 | 1/2005 | Ngo et al. |
| 7,546,661 | B2 | 6/2009 | Connor, Jr. |
| 8,375,514 | B2 | 2/2013 | Dendo |
| D679,170 | S | 4/2013 | Else |
| 8,495,791 | B2 | 7/2013 | Yoon |
| 8,757,698 | B1 | 6/2014 | Rowland |
| 2002/0078537 | A1* | 6/2002 | Shibuya et al. ............... 24/662 |
| 2004/0181899 | A1 | 9/2004 | Horst |
| 2009/0155015 | A1 | 6/2009 | Parisi et al. |
| 2009/0235485 | A1 | 9/2009 | Connor, Jr. |
| 2010/0122429 | A1 | 5/2010 | Gonzalez et al. |
| 2013/0287996 | A1 | 10/2013 | Masanek, Jr. et al. |
| 2014/0113110 | A1* | 4/2014 | Johnson et al. ............... 428/172 |
| 2014/0138509 | A1 | 5/2014 | Lehman |

FOREIGN PATENT DOCUMENTS

| | | |
|---|---|---|
| DE | G9115861.3 U1 | 4/1992 |
| DE | G9300657.8 U1 | 4/1993 |
| DE | 19805949 A1 | 8/1999 |
| DE | 20001405 U1 | 5/2000 |
| DE | 10059322 A1 | 7/2001 |
| DE | 19617408 C2 | 2/2003 |
| DE | 19655255 B4 | 4/2013 |
| EP | 0188639 A1 | 7/1986 |
| EP | 0311736 A1 | 4/1989 |
| EP | 1232070 B1 | 1/2005 |
| EP | 1980444 A2 | 10/2008 |
| FR | 1405310 A | 7/1965 |
| FR | 92613 A | 12/1968 |
| FR | 2970446 A1 | 7/2012 |
| GB | 1236407 A | 6/1971 |
| GB | 2087229 A | 5/1982 |
| JP | 2010180929 A | 8/2010 |
| JP | 2011195071 A | 10/2011 |
| WO | 9745291 A1 | 12/1997 |
| WO | 2011033482 A1 | 3/2011 |
| WO | 2012039058 A1 | 3/2012 |

OTHER PUBLICATIONS

US Patent and Trademark Office Acting as International Searching Authority, International Search Report and Written Opinion of the International Searching Authority issued on International Application No. PCT/US2013/038361 on Oct. 10, 2013.

European Patent Office, Extended European Search Report issued on European Patent Application No. 14162357.9-1758 on Jun. 6, 2014.

US Patent and Trademark Office Acting as International Searching Authority, International Search Report and Written Opinion of the International Searching Authority issued on International Application No. PCT/US14/41898 on Sep. 23, 2014.

* cited by examiner

US 9,199,567 B1

VEHICLE FLOOR COVER RETENTION DEVICE WITH SPIKED BASE

BACKGROUND OF THE INVENTION

In most conventional vehicles, such as cars, trucks and SUV's, the foot wells for the occupants are carpeted. Often the automotive manufacturers offer floor mats to protect these foot wells. Automotive aftermarket manufacturers also offer floor covers to protect the foot wells. Vehicle floor covers, including floor mats and trays, preferably are furnished with placement and securing aids so that they will stay in one place in the vehicle foot well.

To aid in the placement and stability of vehicle floor covers and ultimately provide a more solid feel to the occupant's feet, vehicle manufacturers (commonly called original equipment manufacturers or OEMs) usually place retention posts or other structure in the vehicle foot wells. Often the floor mats or trays have respective apertures sized to accept the retention posts through them. However, retention post morphology and use vary from manufacturer to manufacturer and may even vary from model to model and seat to seat. The variance in OEM mat retention systems makes the provision of aftermarket floor mats and trays for these models more costly and less universal. In many instances, OEMs will provide floor mat retention devices for the driver's side but none for the passenger's side and none for any other seat position.

Thus a need exists for a vehicle floor cover retention device that can be used to secure a vehicle floor mat or tray when there is no retention post or other device or structure in the foot well and that is easy for a consumer to use.

SUMMARY OF THE INVENTION

According to one aspect of the invention, a device is provided for fastening a vehicle floor cover to carpeting in a vehicle foot well. The device includes a body with a first and second face and an axis perpendicular to the first and second faces. Projections extend from the first, lower face with the projections being in linear rows forming a two-dimensional array. Each projection has a vertical face in alignment with the axis with the vertical faces in any one row being coplanar. The vertical faces in a first row face the vertical faces in a second row. A fastener, sized to be received in a grommet, extends from the second, upper face.

According to another aspect of the invention, there is provided a system for releasably attaching a vehicle floor cover to carpeting in a vehicle foot well. The carpet affixation member has a body with a first face and a second face. An axis is perpendicular to the first and second faces. Projections extend from the first face in parallel to this axis. A fastener integrally formed with the body extends upwardly from the second face. A top grommet or cap receives the fastener and thereby attaches the vehicle floor cover to the carpeting.

According to yet another aspect of the invention, there is provided a system for releasably attaching a vehicle floor cover to carpeting in a vehicle foot well. The carpet affixation member has a body with a first face and a second face. An axis is perpendicular to the first and second faces. Projections extend from the first face in parallel to this axis. A fastener integrally formed with the body extends upwardly from the second face. A bottom grommet, with a bottom grommet fastener, attaches to the fastener of the affixation member. A top grommet receives the bottom grommet fastener and thereby attaches the vehicle floor cover to the carpeting.

According to yet another aspect of the invention, a method of manufacturing a device for affixing a vehicle floor cover to the carpeting of a foot well is provided. The steps include providing a mold with a top side and a core side. A plane splits the top side from the core side. A top side mold cavity molds the second face of the device. Several spaced-apart parallel ejector bars slide in channels of the core body in alignment with the axis. A top surface of a core body and top surfaces of the ejector bars mold a first face of the device. Each ejector bar has at least one vertical face and along the vertical face there are spaced-apart spike cavities.

To mold the device, the ejector bars are placed so that they are coplanar with the top surface of the core body. The top side of the mold is closed and a polymer is injected into the closed mold. When the mold is opened, the ejector bars are moved from their coplanar position to one in which the top surfaces of the ejector bars are above the top surface of the core body, thereby ejecting the molded device.

In an alternative embodiment, the ejector bars are replaced with a cylindrical ejector sleeve that can be coaxial with an axis of the retention device. Each of the projections or spikes has a vertical face that is located at the exterior and/or interior surface of the ejector sleeve. In this embodiment, the projections or spikes may be arranged in one or two annular arrays.

According to one aspect of the invention, a device is provided for fastening a vehicle floor cover to carpeting in a vehicle foot well. The device includes a body with a first and second face and projections extending from the first face. The projections are in linear rows forming a two-dimensional array. A fastener, sized to be received in a grommet, extends from the second face.

A principal advantage of this device is that it can be placed anywhere in the foot well to accommodate foot covers with holes in various locations. Another advantage is that device(s) according to the invention can be furnished for those floor covers for which the vehicle manufacturer has not provided any retention devices in the vehicle foot well. This may occur, for example, where the vehicle manufacturer has provided no such retention devices for any seating position, or where the vehicle manufacturer has provided retention devices only for the front driver's side foot well. Devices according to the invention may also be used to attach a mat or tray to a vehicle floor in the second or third row of seats, or to attach a cargo liner to the floor of a vehicle cargo area.

BRIEF DESCRIPTION OF THE DRAWINGS

Further aspects of the invention and their advantages can be discerned in the following detailed description, in which like characters denote like parts and in which.

FIG. A is a perspective view of the top of a device according to the invention.

DETAILED DESCRIPTION

Figure 1A:
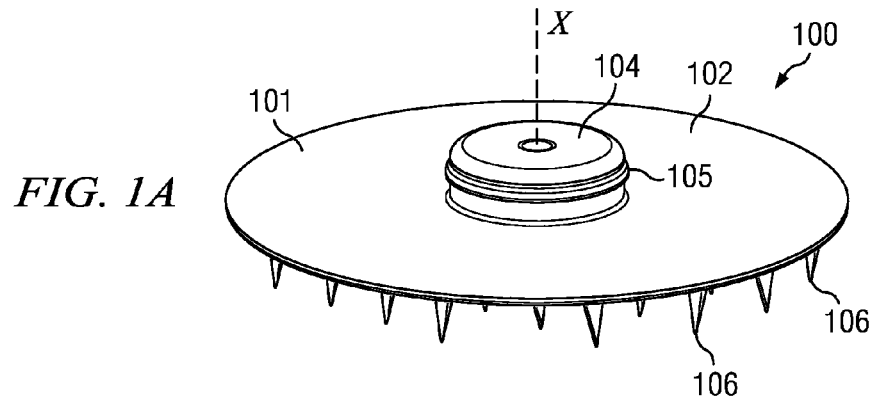
FIG. 1B is a perspective view of the bottom of the device shown in FIG. 1A.
FIG. 1C is a detail of the bottom of the device shown in FIG. 1B.
Figure 1B:
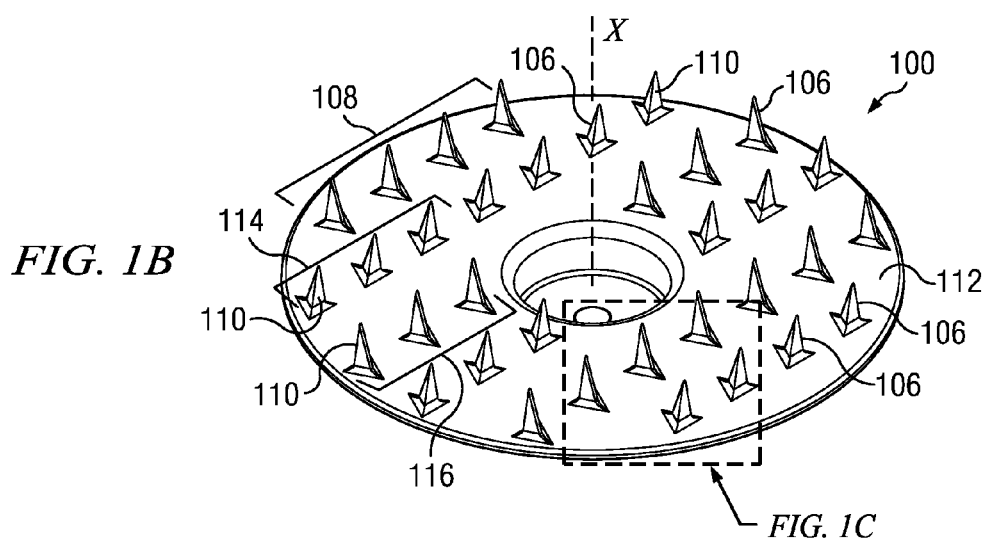

FIGS. 1A and 1B illustrate a first embodiment of a device indicated generally at 100. The body 101 of the device may be formed of nylon or another suitable compound. The device 100 has a first lower face 112 and a second upper face 102. An axis X is perpendicular to the first and second faces (112, 102). The body 101 is thin and flat, and in the illustrated embodiment is shown to be a generally circular disk. Other embodiments may have a body 101 that is a different shape such as square, rectangular, hexagonal, or any other shape which produces commercially acceptable results.

Many projections 106 downwardly extend from the first face 112 in parallel with the device axis X. In this embodiment, the projections 106 are arranged in linear rows 108. In the illustrated embodiment the projections 106 have a triangular base and are pyramidal in shape. The projections 106 in the illustrated embodiment are spikes. Other embodiments may have projections that are different shapes and/or have bases of different shapes such as substantially circular cones or rectangular pyramids. The projections 106 bite into the carpeting of the foot well floor (See FIGS. 3 and 802 in FIG. 8) which prevents the device 100, and the floor cover attached to it, from moving. In addition the device 100 may be positioned anywhere in the foot well where the entire device 100 can be received on a substantially flat area. In other words, placement on the foot well floor (See 802 in FIG. 8) in a substantially flat area is appropriate whereas placement on the foot well floor 802 where it transitions to foot well walls 804, 806, 808, 814 (FIG. 8) is less so, depending on the severity of the curved transitions. With the ability to place the device 100 anywhere on the foot well floor, almost all vehicle floor covers will be compatible with the device and can be releasably fastened to the foot well floor using this device.

Each of the projections 106 in this illustrated embodiment has one flat vertical face 110 which is in alignment with axis X. Projections 106 in other embodiments may not have a flat vertical face 110. In each linear row 108, the vertical faces 110 of the projections 106 in that row 108 are coplanar. There is at least a first row 114 and a second row 116 on the lower device face 112. The vertical faces 110 in the first row 114 are oriented to face the vertical faces 110 of the second row 116. The embodiment illustrated in FIG. 1B shows more than two rows in which case the pattern is repeated. Alternative embodiments may have a different number of rows. As illustrated, the vertical faces 110 of the end rows, such as the row 108 appearing leftmost in this view, do not have a corresponding facing row. In the illustrated embodiment, the shape, number and placement of the projections 106 was chosen to achieve a commercially acceptable stable attachment for floor cover placement and are provided as a function of carpet density and thickness. Other embodiments may include variations that achieve a commercially acceptable stable attachment for floor cover placement. As pressed into the vehicle floor carpeting, the size, number, and length of projections 106 should be selected so as to successfully withstand the largest shear force likely to be imposed on the mat or tray by an occupant's feet.

Figure 1C:
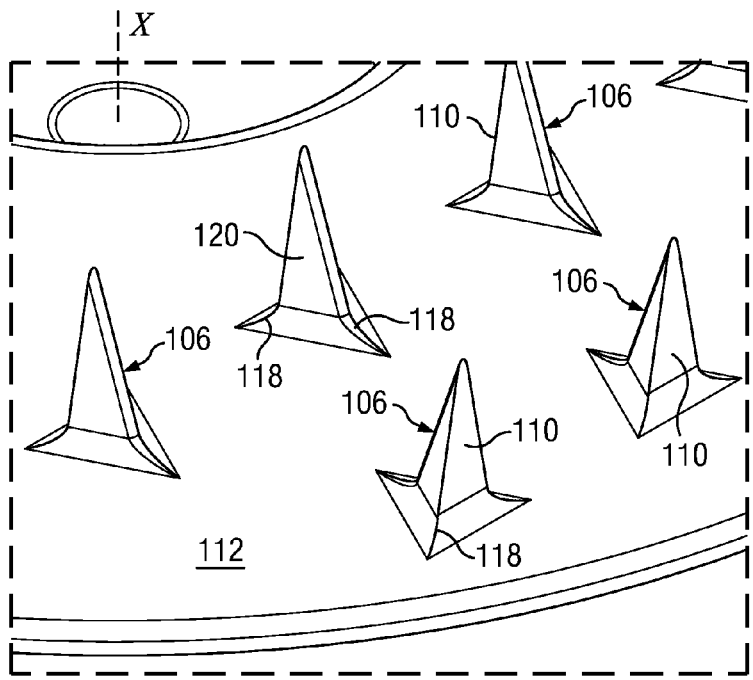

FIGS. 1A-1C illustrate an embodiment where the projections 106 extend approximately 0.1 to 0.3 inches from the lower face 112. In alternative embodiments the projections 106 may have different lengths. In the illustrated embodiment the rows 108, 114, 116 are approximately 12 millimeters apart. In alternative embodiments the rows 108, 114, 116 may be spaced closer together or farther apart and may not be equidistant from each other. In each row 108, 114, 116, the projections 106 are spaced from adjacent projections 106 by approximately 9.6 millimeters. In alternative embodiments the projections 106 may be closer to or farther from adjacent projections 106 in the same row 108, 114, 116 and may not be uniformly spaced. In the illustrated embodiment, the projections 106 have a triangular base where each leg of the base is approximately 2.5 millimeters wide. Alternative embodiments with projections 106 with triangular bases may have triangular bases with wider or narrower widths. The triangular bases of each projection have concavely curved transitions 118 where the base of the projection on the first face 112 meets the first face 112 and other faces 120 of the projections. The curved transitions 118 add reinforcement against shear forces, i.e., forces acting perpendicular to axis X.

Figure 4:
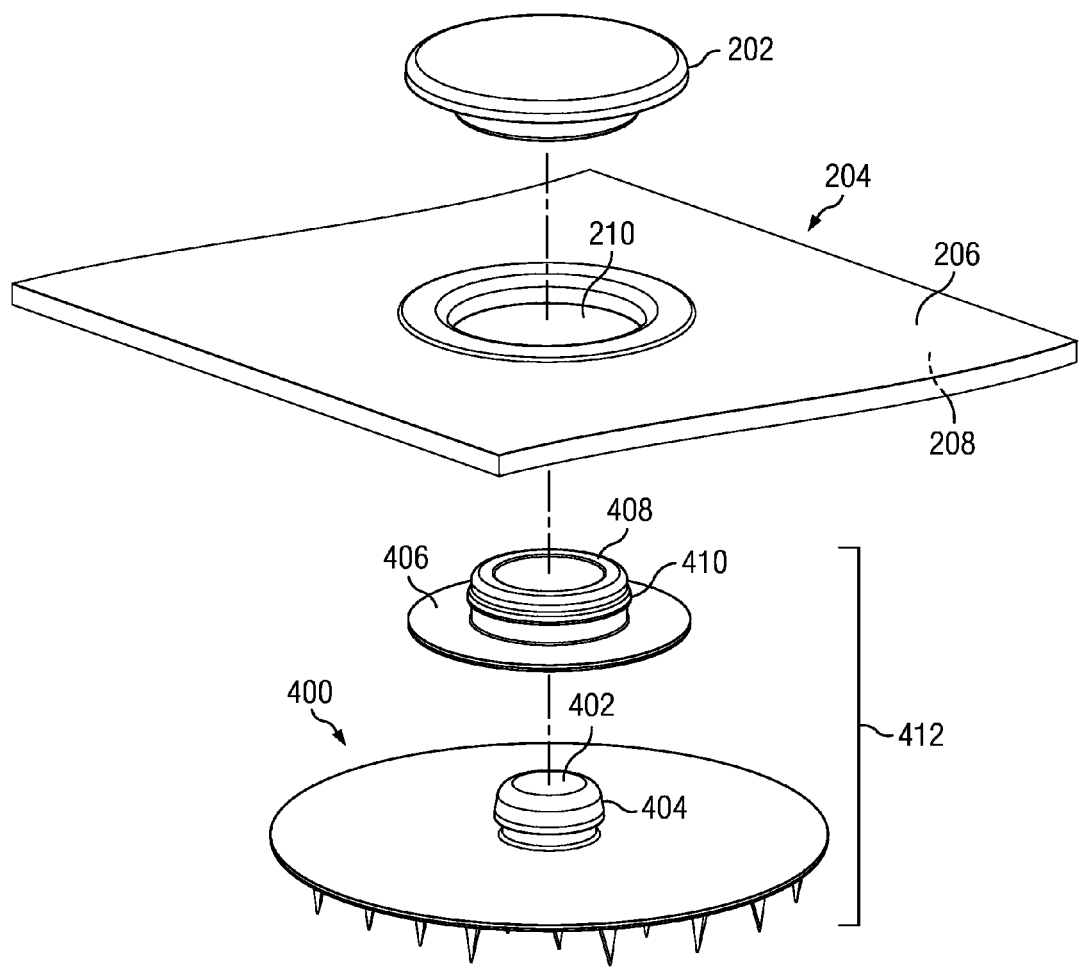
FIG. 4 is a detailed exploded isometric view of a second embodiment of a vehicle floor cover retention system using another device according to the invention.

A fastener or knob 104 upwardly extends from the relatively smooth second, upper face 102. The fastener 104 is sized to be received by a grommet or cap 202 (FIG. 2) or 406 (FIG. 4). In the illustrated embodiment, the fastener 104 has an outwardly projecting convex annular ring 105 that snaps into a grommet (See 202 on FIGS. 2 and 406 on FIG. 4). In the illustrated embodiment, fastener 104 is substantially cylindrical and is formed around axis X. The ring 105 is upwardly displaced from face 102. This creates a "mushroom head" fastener 104 in which a stem thereof has a smaller diameter than a head defined by ring 105.

Figure 2:
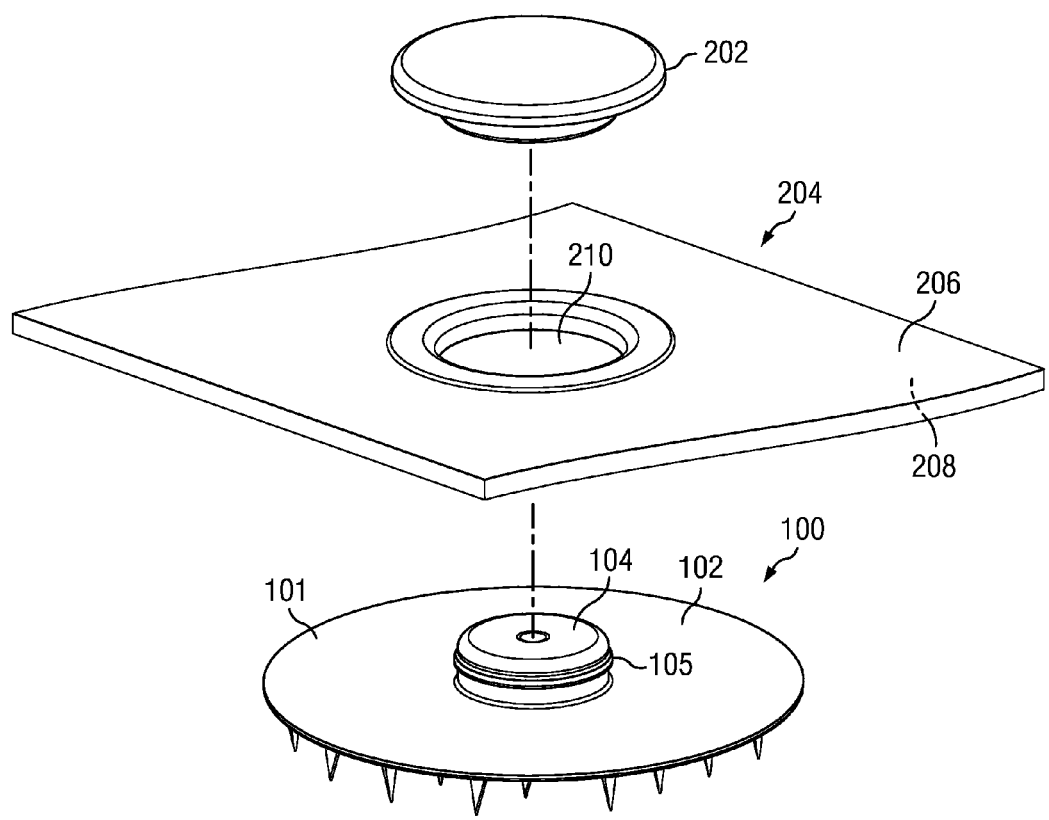
FIG. 2 is a detailed exploded isometric view of a vehicle floor cover retention system using the device seen in FIGS. 1A and 1B.

FIG. 2 illustrates a vehicle floor cover 204 fastened between the affixation device 100 and the cap or top grommet 202. The mat or tray 204 has an upper surface 206 and a lower surface 208. A hole 210 extends from the upper surface 206 to the lower surface 208. The hole 210 is adapted to receive the fastener 104 or a carpet affixation bottom unit (See 412 on FIG. 4). A top grommet or cap 202 snaps onto the fastener 104, or alternatively to a carpet affixation bottom unit 412 (FIG. 4) to attach the vehicle floor cover 204 to the vehicle carpet. The vehicle floor cover 204 may be a mat, a three dimensional floor tray or any other vehicle floor cover for use in a vehicle foot well. Once the vehicle floor cover 204 is attached to the device 100, and once device 100 is pressed into the carpet pile, the vehicle floor cover 204 will remain in place in the vehicle foot well.

Figure 3:
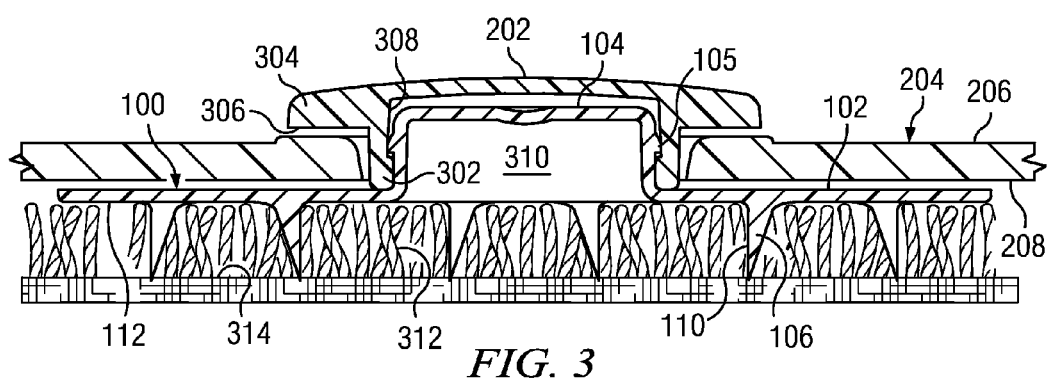
FIG. 3 is a cross sectional view taken through an assembled vehicle floor cover, device and top grommet.

FIG. 3 illustrates a cross-sectional view of the grommet or cap 202 connected to the fastener 104. The grommet 202 has a top portion 304 that extends radially beyond the annular ring 105 of the fastener 104 and over all of the hole 210. While the illustrated grommet 202 is a closed cap, alternatively the grommet 202 may have a top portion 304 that is open. The top portion 304 of the grommet 202 has a lower surface 306. The vehicle floor cover is captured between the lower surface of the grommet 306 and the top surface 102 of the affixation device 100.

In operation, the fastener 104 is inserted into the hole 210 of the vehicle floor cover 204. The grommet 202 has a radially inwardly extending engagement ridge 302 which snaps over the annular ring 105 of the fastener 104. The engagement ridge 302 extends from the downwardly depending substantially cylindrical sidewall 308. The cylindrical sidewall 308 forms an orifice 310 that receives the fastener 104. When the grommet 202 is attached to the fastener 104 the vehicle floor cover 204 is positioned in between the lower surface 306 of the grommet 202 and the second face 102 of the device 100. The device is placed on the vehicle foot well carpet and bites into the carpet pile 312. The projections 106 extend through the carpet pile 312 but are sized so as not to extend through the carpet backing 314 of the vehicle foot well carpeting 310. Accordingly, the floor cover is secured to the vehicle foot well.

FIG. 4 is an exploded view illustrating how the vehicle floor cover 204 is fastened between an affixation device 400, a bottom grommet 406, and the top grommet or cap 202. The floor cover or mat 204 has an upper surface 206 and a lower surface 208. A hole 210 extends from the upper surface 206 to the lower surface 208. The hole 210 is adapted to receive an upstanding bottom grommet fastener 408, which is part of a carpet affixation bottom unit 412. In this embodiment the carpet affixation bottom unit 412 includes the bottom grommet 406 and the affixation device 400. The bottom grommet 406 is adapted to receive the upstanding fastener or knob 402 of the affixation device 400. Fastener 402 is similar in form to fastener 202 but may have a smaller diameter. The bottom grommet 406 snaps onto the fastener 402 and is securely attached via the fastener annular ring 404. A top grommet 202 connects to the carpet affixation bottom unit 412 by snapping onto the bottom grommet fastener 408. The top grommet 202 is securely attached to the bottom grommet 406 via a radially outwardly extending annular ring 410 on the bottom grommet fastener 408. In the illustrated embodiment the vehicle floor cover 204 is a mat but the vehicle floor cover may also be a three dimensional floor tray or any other vehicle floor cover for use in a vehicle foot well.

Figure 5:
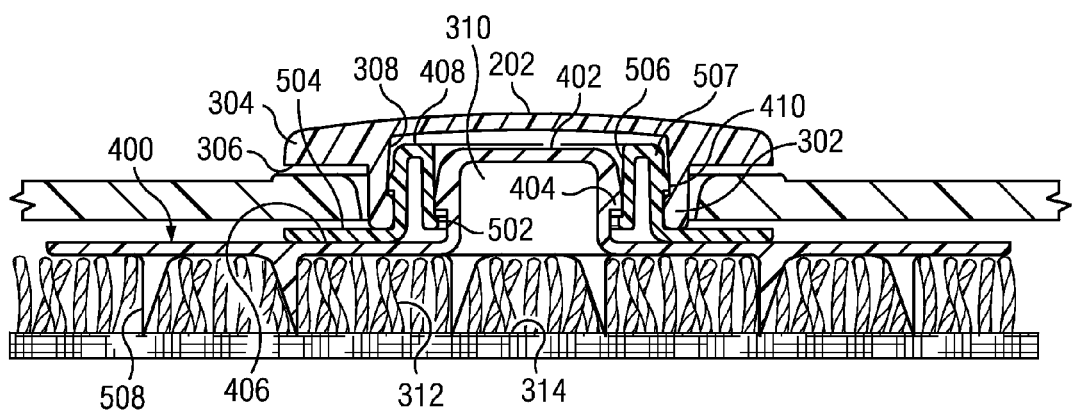
FIG. 5 is a cross sectional view taken through an assembled vehicle floor cover, device, top grommet and bottom grommet as seen in FIG. 4.

FIG. 5 illustrates a cross sectional view of the grommet 202 connected to the bottom grommet 406 and the fastener 402. The grommet 202 has a top portion 304 that extends radially beyond the annular ring 404 of the bottom grommet fastener 408 and, in this illustrated embodiment, completely covers the floor cover hole 210. The top portion 304 of the grommet 202 has a lower surface 306.

In operation, a bottom grommet 406 is snapped onto the fastener 402. The bottom grommet has an inner wall 506 that is connected at its top end to a bottom grommet outer wall 507. Bottom grommet inner wall 506 terminates at its lower end with a radially inwardly extending engagement ridge 502. The vertical displacement of engagement ridge 502 from the top end of inner wall 506 permits it to flex away from and toward the device axis. Engagement ridge 502 therefore can snap over the annular ring 404 of the fastener 402. The bottom grommet fastener 408 is inserted into the hole 210 of the vehicle floor cover 204. The bottom grommet fastener 408 has an annular ring 410 over which the engagement ridge 302 of the top grommet 202 snaps.

Alternatively, the top grommet 202 is assembled to the bottom grommet 406 with the floor cover 204 positioned between them. Then, the affixation device 400 is snapped to the bottom grommet 406. This sequence of assembly permits the retention device 400 to be attached to a previously grommeted mat set, as would be the case for a field retrofit.

The vehicle floor cover 204 is positioned in between the lower surface 306 of the grommet 202 and the top face 504 of the bottom grommet 406. Affixation device 400 has downwardly extending projections or spikes 508 which are similar to spikes 106 as above described. Also, as described above, the projections 508 extend through the carpet pile 312 but are sized so as not to extend through the carpet backing 314 of the vehicle foot well carpeting 310.

Retention devices according to the invention may be furnished to the consumer in a condition in which the projections or spikes 106 are pressed into blocks of cardboard, meltblown polystyrene or the like. These protective blocks prevent injury to the user's hands and prevent damage to the spikes 106, 508. The blocks (not shown would be removed immediately prior to the mat or tray being affixed to the vehicle foot well.

Figures 6A, 6B:
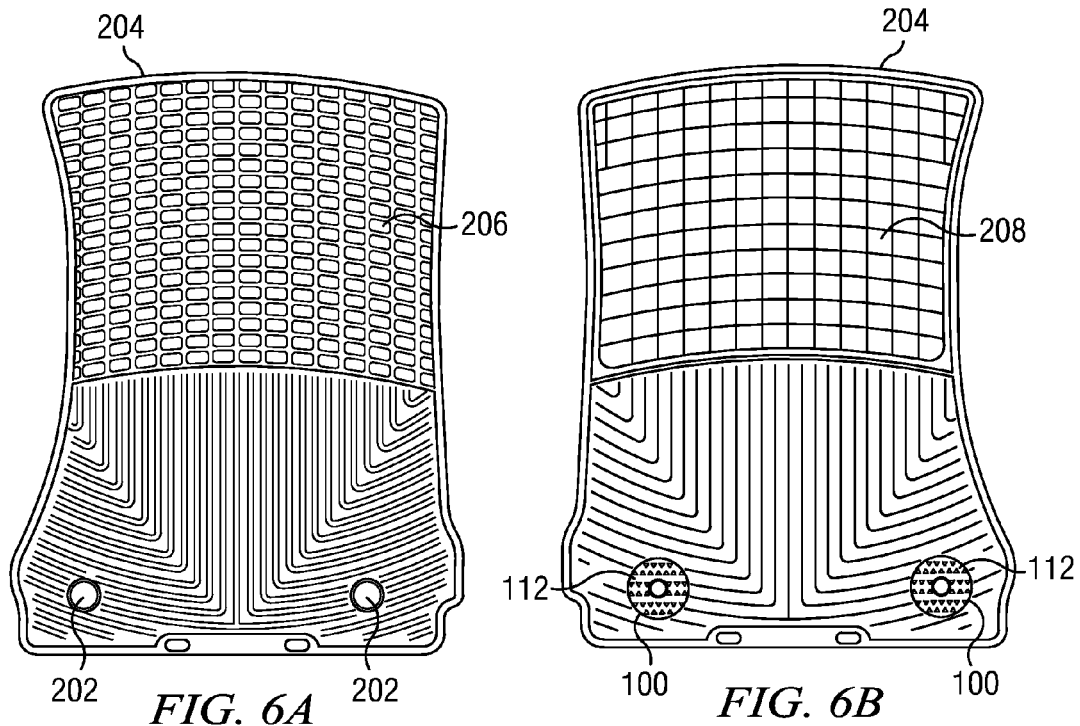
FIG. 6A is a top view of a vehicle floor cover according to the invention.
FIG. 6B is a bottom view of a vehicle floor cover shown in FIG. 6A.

FIGS. 6A and 6B illustrate a representative vehicle floor cover 204, a mat in this instance, with the top grommet 202 and device 100 fastened together. FIG. 6A illustrates the top surface 206 of the vehicle floor cover 204 where the top grommet 202 is visible. FIG. 6B illustrates the bottom surface 208 of the vehicle floor cover 204 where the lower surface 112 of the device 100 is visible.

Figure 7A:
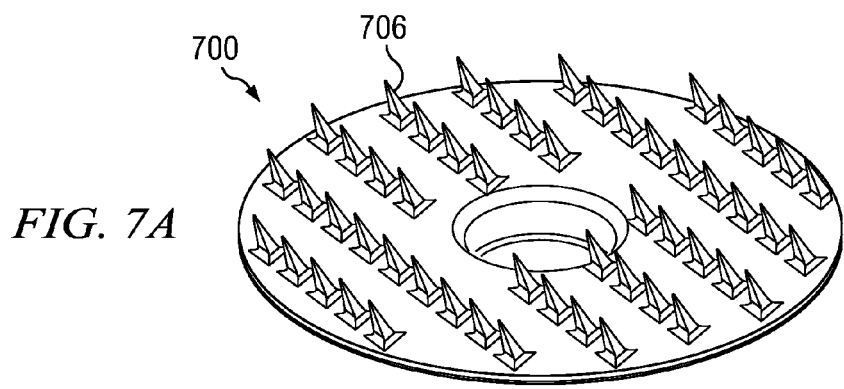
FIG. 7A is perspective view of a third embodiment of a device according to the invention.
Figure 7B:
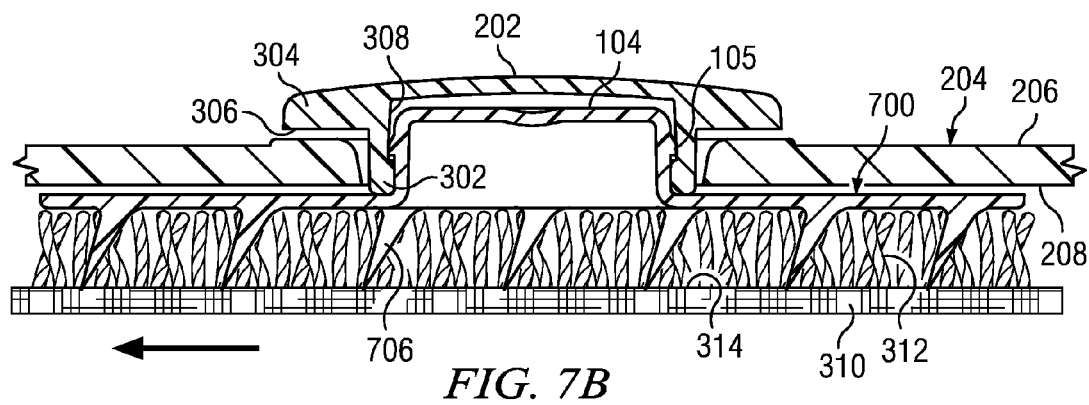
FIG. 7B is a cross sectional view of a vehicle floor cover retention system using the embodiment shown in FIG. 7A.
Figure 10:
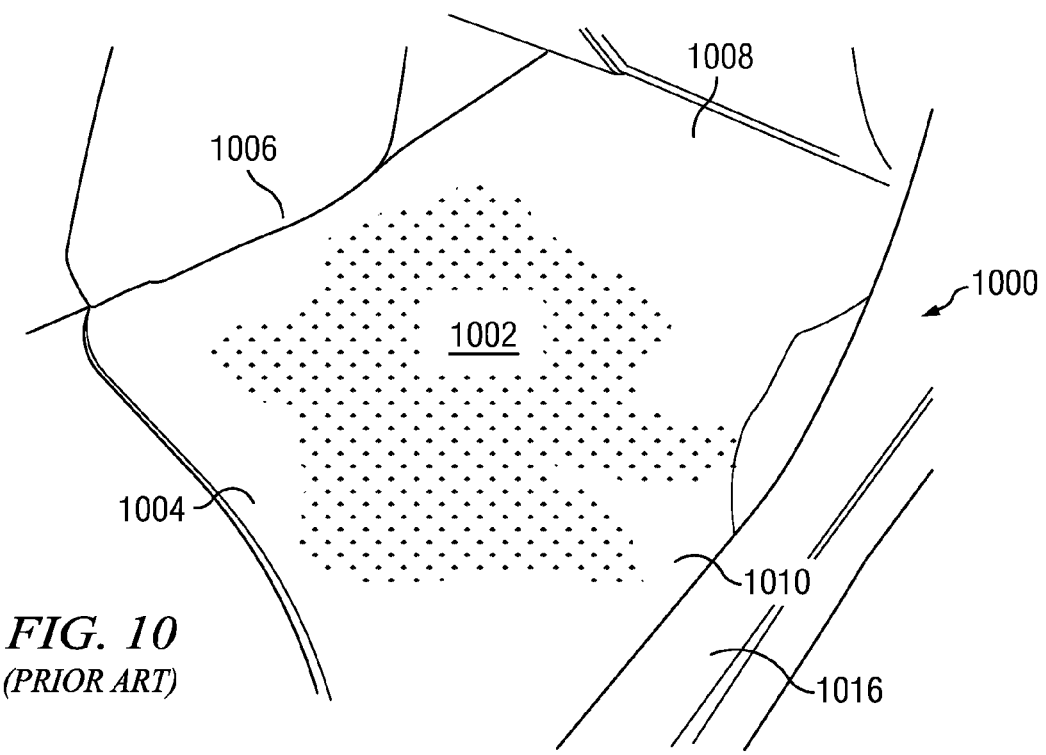
FIG. 10 is a perspective view of a passenger's side vehicle foot well without OEM retention devices and according to the prior art.

FIG. 7A illustrates an alternative embodiment 700 of the device where the projections or spikes 706 do not have a vertical face aligned with the axis. This second embodiment of the device may be used in embodiments where the top grommet 202 attaches to the knob or fastener 104 as shown in FIG. 7B. It may also be used in embodiments where the bottom grommet attaches to the fastener (not illustrated), and may be used with embodiments in which the upstanding device knob is joined to the floor cover by thermoforming (see FIGS. 17 and 18). In using the embodiment illustrated in FIGS. 7A and 7B, the device 700 must be oriented such that the projections 706 are angled toward the front of the vehicle and away from the seat pedestal 804, 1004 (FIGS. 8 and 10).

FIG. 7B illustrates a cross sectional view of the top grommet 202 connected to the fastener or knob 104 of the device 700. The grommet 202 has a top portion 304 that extends radially beyond the annular ring 105 of the fastener 104. The top portion 304 of the grommet 202 has a lower surface 306.

The vehicle floor cover is captured between the lower surface of the grommet 306 and the affixation device 700. The projections 706 extend through the carpet pile 312 but are sized so as not to extend through the carpet backing 314 of the vehicle foot well carpeting 310. As unrestrained, floor mats or trays have a tendency to be kicked forward by an occupant's feet, and in response they will wrinkle or ride up onto the vehicle firewall. As installed with the projections 706 facing forward in the direction of the arrow shown in FIG. 7B, the projections 706 will resist this forward shear force and will bite further into the carpet pile.

Figure 8:
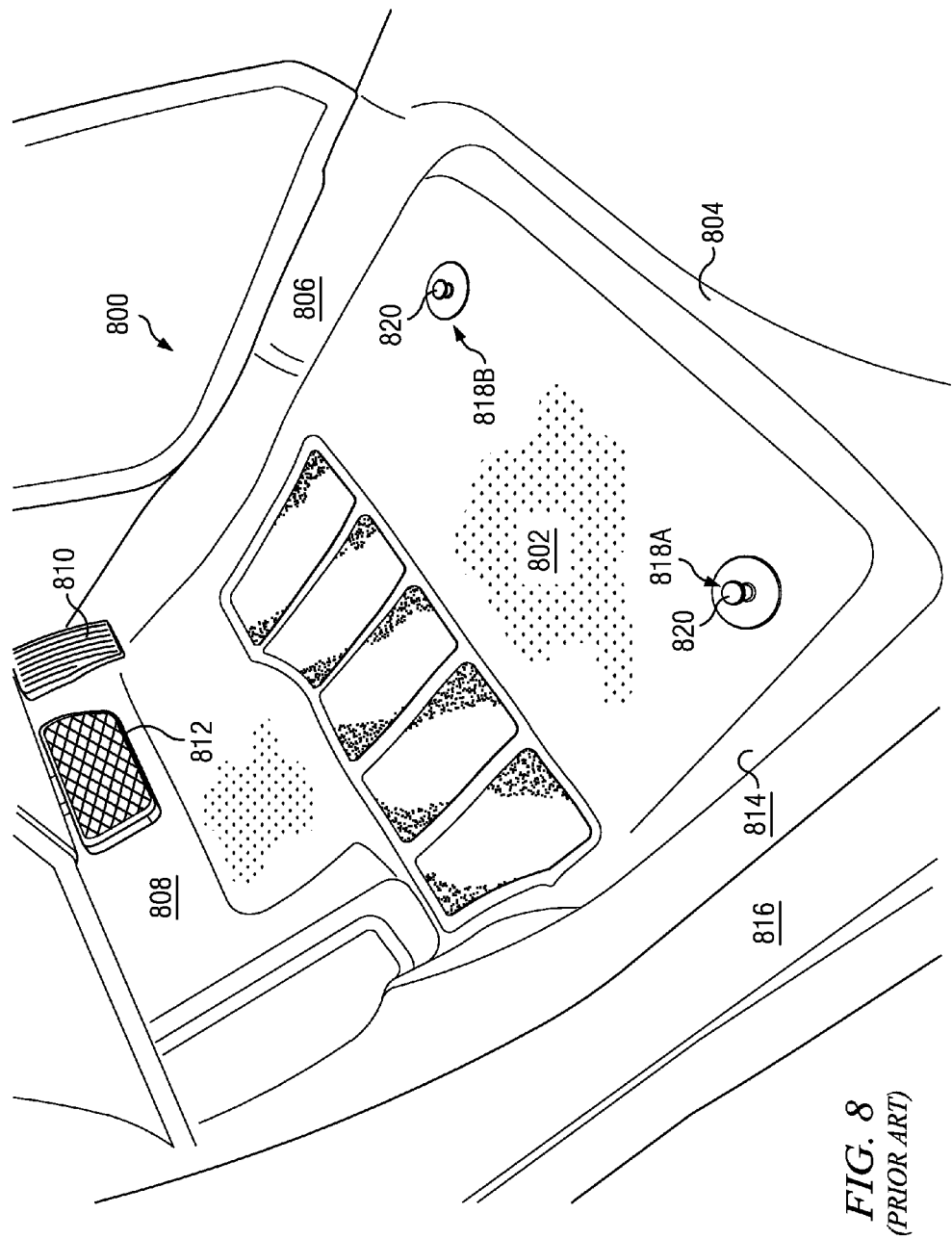
FIG. 8 is a perspective view of a driver's side vehicle foot well with OEM retention devices according to the prior art.

FIG. 8 shows a typical original equipment manufacturer (OEM) driver's side vehicle foot well 800 prior to a floor mat or tray being placed within it. Typically the floor 802 of the foot well 800 is carpeted. The floor 802 of the foot well 800 may be bounded by other foot well surfaces, so as to form a generally concave shape. These bounding foot well surfaces may include a rear or aft side 804 transitioning the floor 802 to a seat pedestal (not shown); an inboard side 806, which will be disposed between the floor 802 and a transmission tunnel or center console; a firewall 808 which is a forward continuation of floor 802 and which generally slopes upwardly and forwardly, and forward of the gas and brake pedals 810 and 812, and an outboard side 814 which is disposed between the foot well floor 802 and a door sill 816.

Particularly on the driver's side, vehicle manufacturers now usually (but not always) equip the floor well 800 with one or two hold-down or retention devices, to fix the vehicle floor cover in place and prevent its shifting and interfering with the gas pedal 810 and/or brake pedal 812. In this illustrated embodiment there are two OEM retention devices 818A and 818B and they take the form of posts with enlarged heads 820. In the illustrated embodiment, the OEM posts 818A and B are meant to be inserted entirely through respective holes in the OEM floor mat (not shown).

Figure 9:
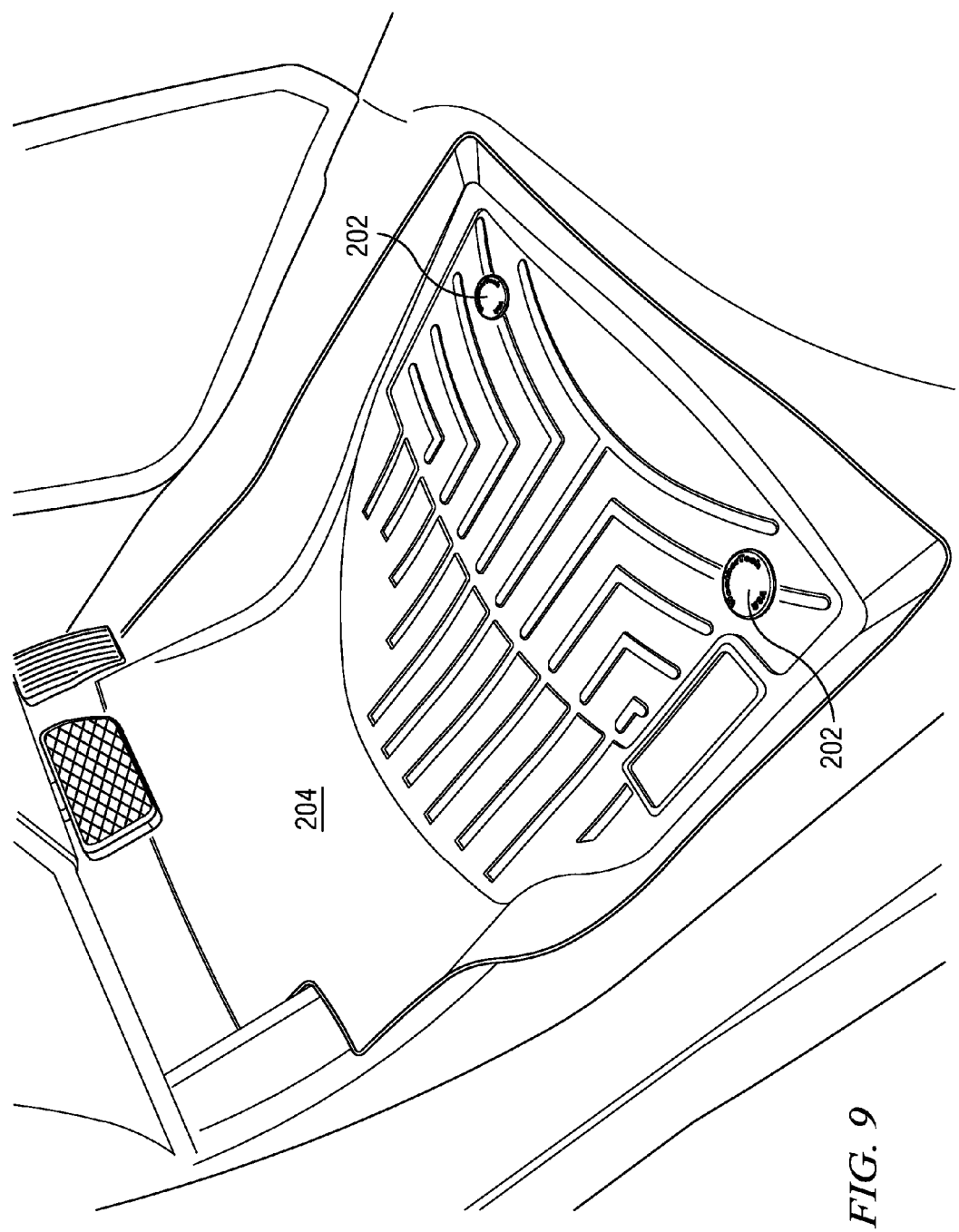
FIG. 9 is a perspective view of a driver's side vehicle foot well with a vehicle floor cover installed.

FIG. 9 shows a vehicle floor tray 204 installed in the driver's side vehicle foot well 800. The OEM retention devices 818 A and B were inserted entirely through the holes 210 in the floor tray 204. Two top grommets 202 are installed to affix the mat 204 to the retention devices 818 A and B.

FIG. 10 illustrates a passenger's side vehicle foot well 1000. Like the driver's side foot well, the floor 1002 of the foot well 1000 may be bounded by other foot well surfaces, so as to form a generally concave shape. These bounding foot well surfaces may include a rear or aft side 1004 transitioning the floor 1002 to a seat pedestal (not shown); an inboard side 1006, which will be disposed between the floor 1002 and a transmission tunnel or center console; a firewall 1008, which is a forward continuation of floor 1002 and which generally slopes upwardly and forwardly, and an outboard side 1010 which is disposed between the foot well floor 1002 and a door sill 1016. Note that in the illustrated model, there are no OEM retention devices in the passenger side foot well 1000. Manufacturer-provided retention devices also may be missing from the second or third row foot wells, and/or may be missing from a carpeted cargo area to the rear of the last passenger row.

Figure 11:
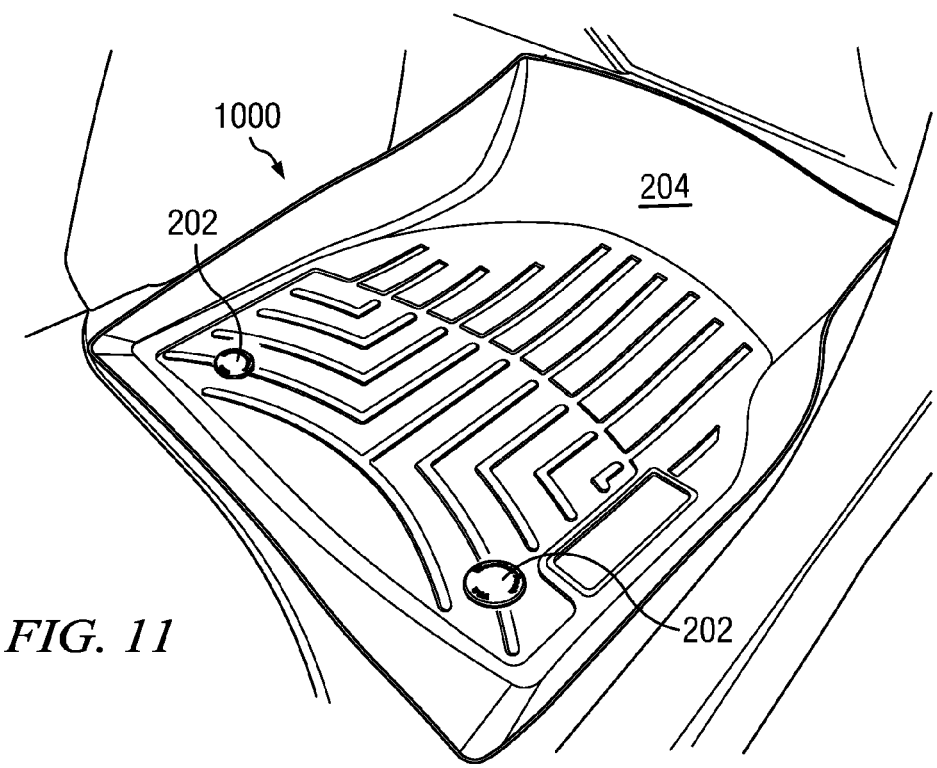
FIG. 11 is a perspective view of a passenger's side vehicle foot well with a vehicle floor cover installed using the device shown in FIGS. 1A and 1B.
Figure 12:
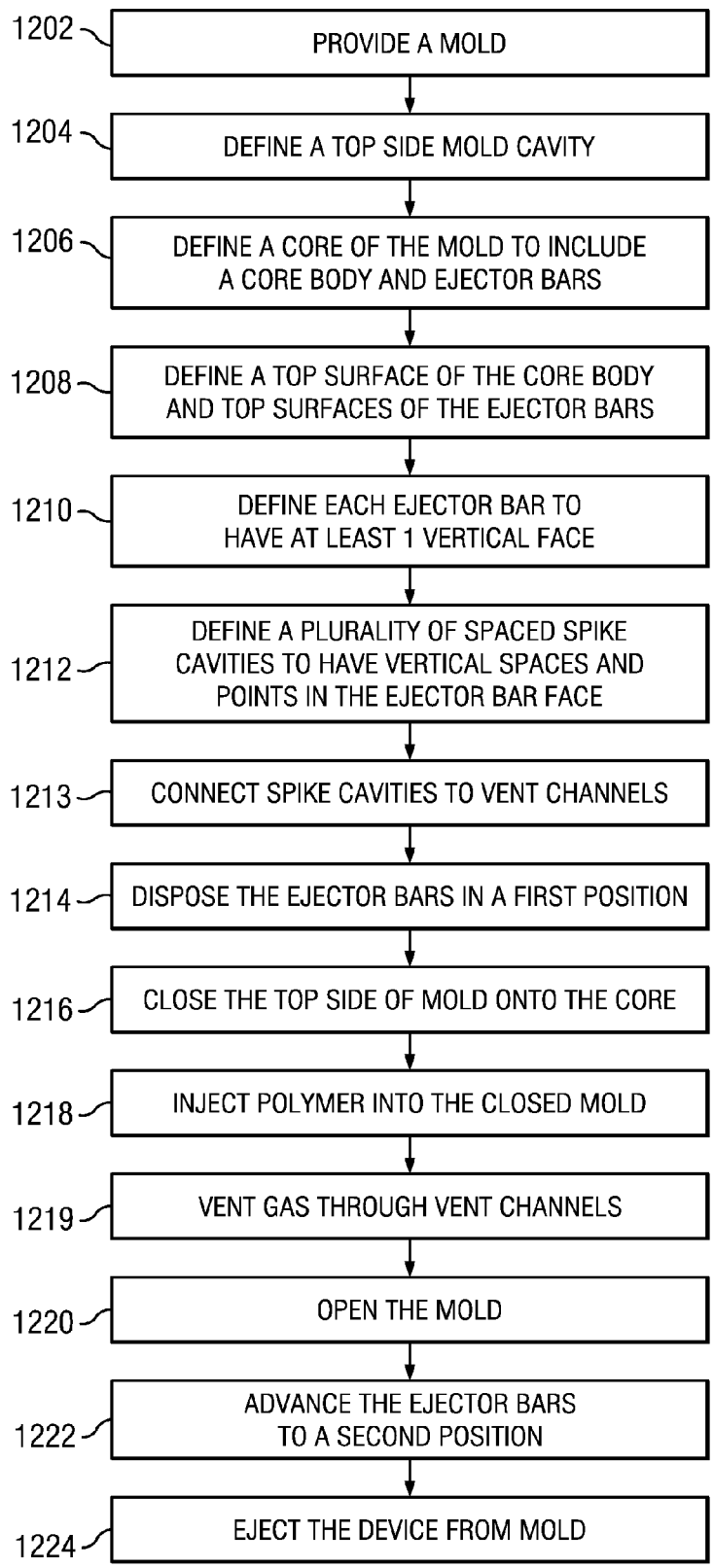
FIG. 12 is schematic block diagram showing steps in a first manufacturing process according to the invention.

FIG. 11 illustrates a passenger side vehicle floor tray 204 installed in the passenger side vehicle foot well 1000. The top grommets 202 are attached to respective fasteners 104 of affixation devices 100 (not visible in this view). In FIGS. 8-11, the driver's side foot well is positioned on the left side of the vehicle and the passenger's side foot well is positioned on the right side of the vehicle. This would be the case for North American and Continental European vehicles. For countries having vehicles in which the driver's side is on the right hand side (e.g. the UK, Australia and Japan) the relative positions of the driver's side and the passenger's side will be reversed.

FIGS. 12 through 15 provide an overview of one process for manufacturing a device 100 for affixing a vehicle floor cover 204 to carpeting of a vehicle foot well according to the invention. At step 1202 an injection mold 1300 (FIG. 13) is provided. The mold 1300 has a top side 1302 and a core side 1304; a plane P splits the top side 1302 from the core side 1304. In step 1204, the top side 1302 of the mold cavity is defined. The top side mold cavity 1302 molds the second upper face 102 of the device 100 in the plane P and a fastener or knob 104 to upwardly extend from the second face 102 along an axis X.

Figure 16:
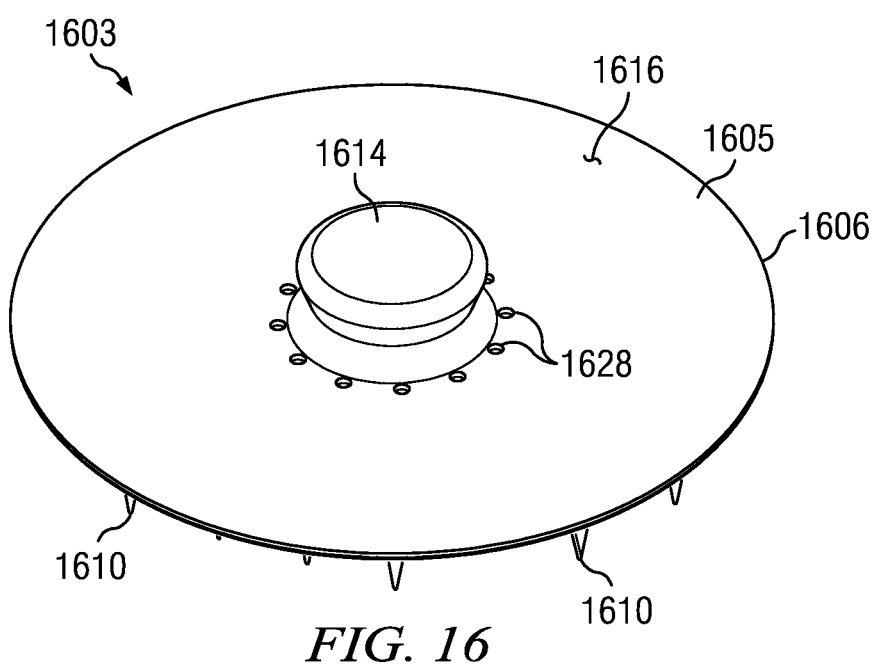
FIG. 16 is a perspective top view of another embodiment of the floor cover retention device, shown prior to its attachment to a thermoformed floor cover.

At step 1206 the core 1304 of the mold 1300 is defined to include a core body 1306 and a plurality of spaced-apart parallel ejector bars 1308, each of the ejector bars 1308 being slidable within respective channels 1310 of the core body 1306 in alignment with the axis. The top surface 1312 of the core body 1306 and top surfaces of the ejector bars 1318 are defined in step 1208. Each of the ejector bars 1308 has at least one vertical face 1316 (step 1210), and most ejector bars have two such faces 1316 which will bound spike cavities 1502. As shown in FIG. 16, along each vertical face 1316, a plurality of spaced-apart spike cavities 1502 downwardly extend from the top surface of the plane P (step 1212). In some embodiments, such as the embodiment illustrated in FIG. 15, at least the interior ones of the ejector bars 1308 may have spike cavities 1502 on a first and a second, opposed vertical face. The spaced-apart spike cavities 1502 terminate in respective apices or points. In some embodiments the apices in each row may connect to a vent channel 1402 (step 1213), permitting gas to escape and insuring that the apices of the spike cavities 1502 become completely filled with polymer.

Figure 13:
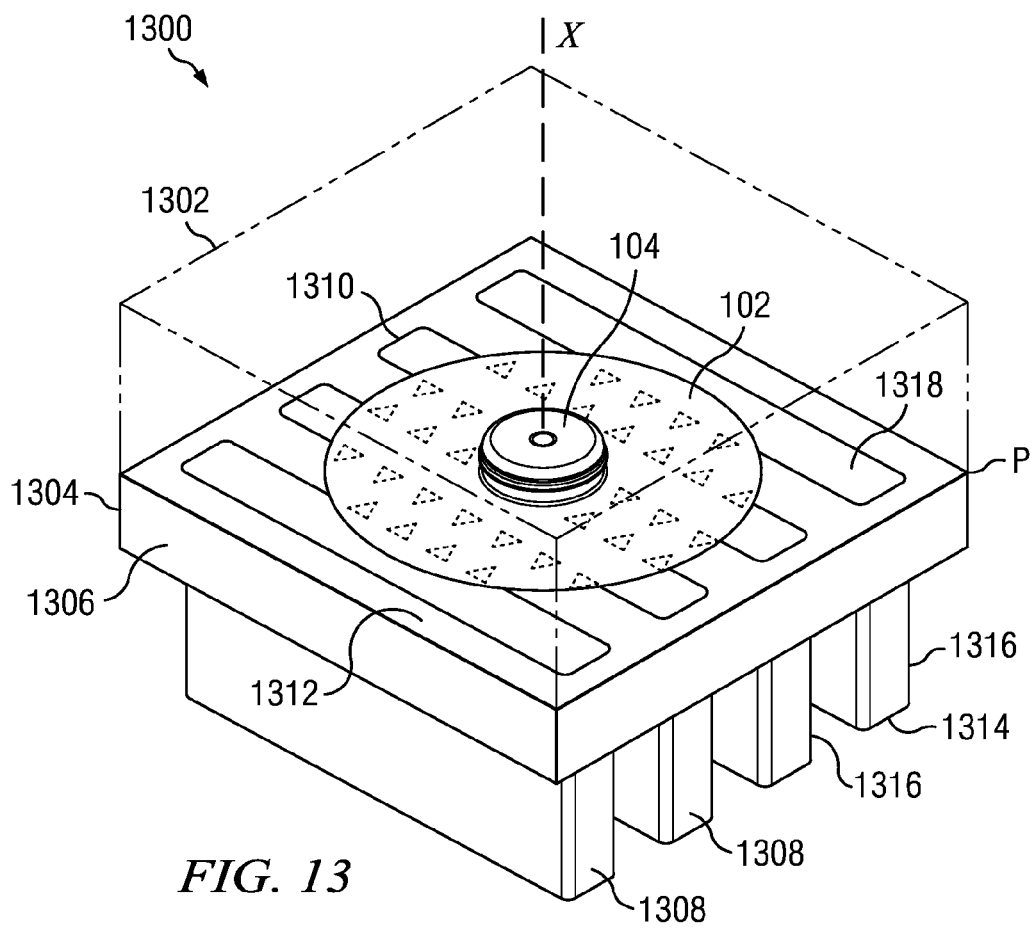
FIG. 13 is a perspective view of a mold used to make the device with ejector bars in a first position.

In step 1214, when the device 100 is being molded, the ejector bars 1308 are positioned such that the top surfaces 1318 of the ejector bars are coplanar with the top surface of the core body 1312, as is shown in FIG. 13. The top side 1302 of the mold 1300 is closed onto the core 1304 in step 1216.

Figure 14:
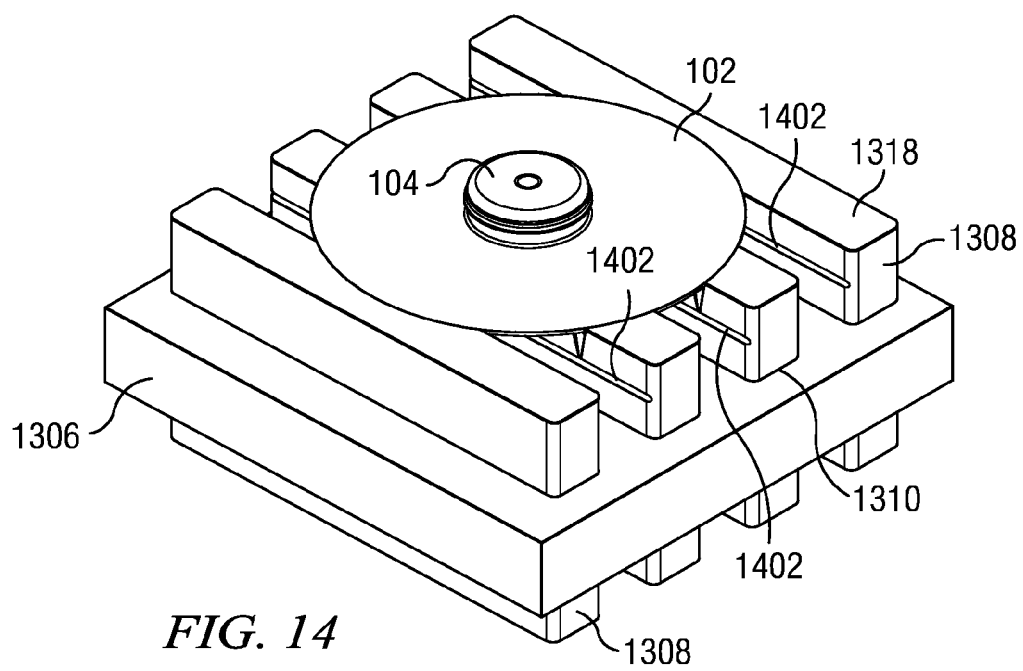
FIG. 14 is a perspective view of the mold core with ejector bars in a second position.
Figure 15:
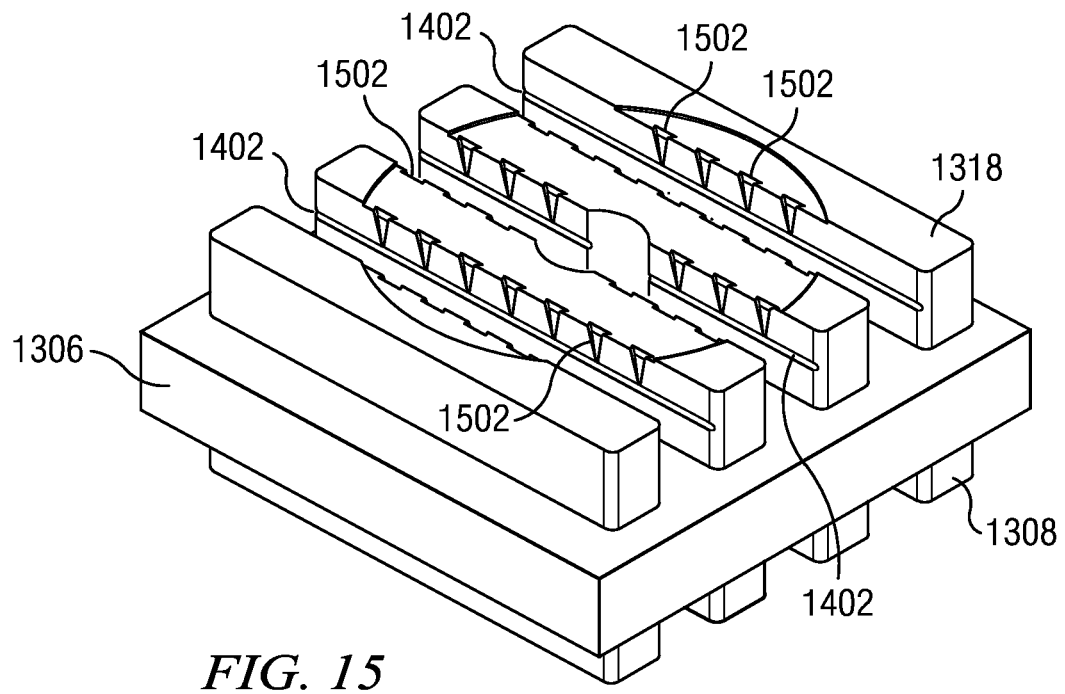
FIG. 15 is a perspective view of the mold core with the ejector bars in a second position and spike cavities being visible.

Once the mold is closed, polymer is injected into the closed mold to form the first face 112, the second face 102, the fastener or knob 104 and the spikes 106 (step 1218). Gas is vented through the vent channels in step 1219. The mold 1300 is then opened in step 1220. The next step (1222) is to advance the ejector bars 1308 from the first position where the top surface 1318 of the ejector bars are coplanar with the top surface of the core body 1312, to a second position where the top surfaces of the ejector bars 1318 are above the top surface of the core body 1312, as is shown in FIG. 14. In step 1224 the device 100 is ejected from the device mold 1300.

FIGS. 16-21 illustrate an embodiment of the invention in which the retention device, indicated generally at 1603, is directly attached to a floor cover 1604 during the course of its manufacture. The device has a thin, flat base 1605 with an outer margin 1606. A plurality of projections or spikes 1610 extend downwardly from a lower surface 1612 of the base 1605, as before. A knob 1614 extends upwardly from an upper surface 1616 of the base 1605.

The device 1603 is attached to the floor cover 1604 (which may be a floor mat or floor tray) during a process of thermoforming the floor cover 1604 from a flat blank of thermoplastic material having a substantially uniform thickness. A height of the knob 1614 from its top surface 1618 to the base upper surface 1616 must be at least twice, and preferably is at least three times, the thickness of the blank used to thermoform the floor cover 1604, to permit the blank to conform to the external sidewall surface 1620 of the knob 1614 during thermoforming.

Knob 1614 is shaped such that the external sidewall surface 1620 is flared radially outwardly at or near its top surface 1618, making a flared portion 1626, and is then relatively constricted as its junction with base top surface 1616 is approached. In the embodiment shown, the knob 1614 is formed to be radially symmetrical around an axis Z, but it could be otherwise. A right radius from knob surface constriction 1624 to axis Z is substantially less than a right radius from flared portion 1626 to axis Z.

A plurality of through-holes 1628 optionally may be formed to extend from upper surface 1616 to lower surface 1612 of base 1605. The through-holes 1628 should be positioned so as to be near the junction of the external sidewall surface 1620 and upper base surface 1616. The through-holes 1628 are positioned radially inwardly from the downward projections 1610. In another embodiment (not shown), through-holes 1628 may be joined by a second set of through-holes through the knob sidewall 1629.

Figure 19:
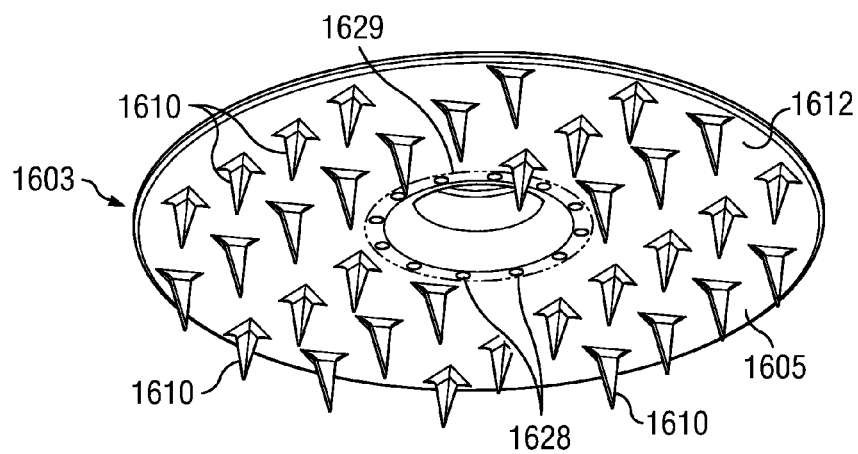
FIG. 19 is a bottom perspective view of an embodiment of the device shown in FIG. 16.

The through-holes 1628 are put in communication with a source of partial vacuum. One way to do this is shown in FIG. 19. An annular channel 1632 is formed in lower surface 1612 so as to communicate to all of the through-holes 1628 and act as a common vacuum feed line.

Figure 20:
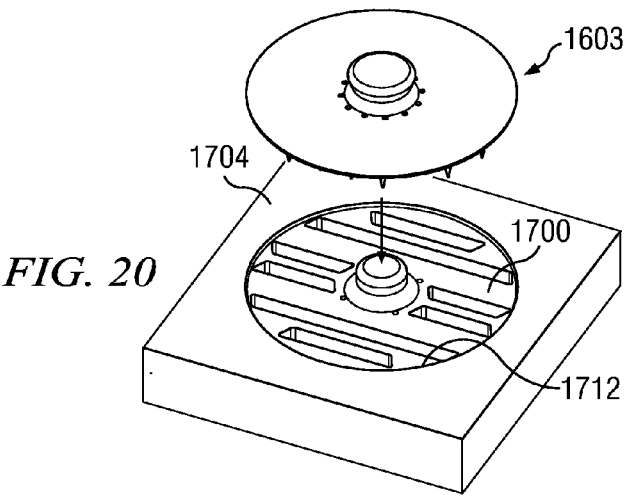
FIG. 20 is a perspective view showing the assembly of a retention device to a vacuum mold prior to a floor cover thermoforming operation.
Figure 21:
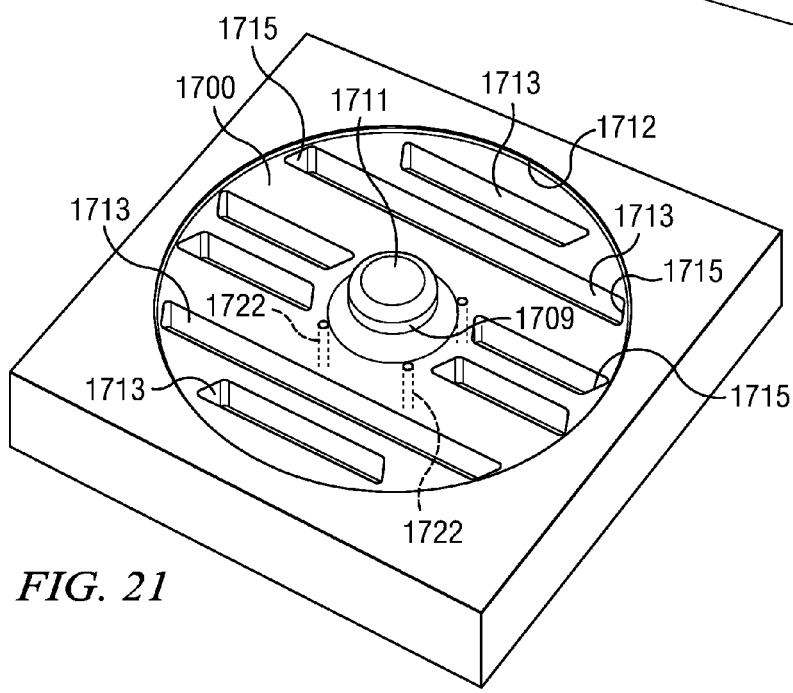
FIG. 21 is a top perspective detail of FIG. 20, showing the mold retention device receiving structure.

Prior to the thermoforming process, and as illustrated in FIG. 20, a previously injection-molded retention device 1603 is placed into a device-receiving structure 1700 formed in an upper face of a female vacuum mold 1704. The receiving structure 1700 is shown in more detail in FIG. 21. Structure 1700 has a disk-like recess 1712 with an outer margin that is shaped to closely receive the outer margin 1606 of the device base 1605. The depth of recess 1712 is selected to be the same thickness as device base 1605, so that upper surface 1616 of device 1603 will be flush with the local upper surface of the vacuum mold 1704.

Disposed radially inwardly from the recess margin are a plurality of parallel, spaced apart clearance slots 1713. The clearance slots 1713 each receive a row, or part of a row, of the spikes 1610. In the center of structure 1700 is an upstanding alignment post 1711 that fits within the interior of device knob 1614 and aids in the registration of a device 1603 with the receiving structure 1700. Particularly as terminated with angled surfaces 1715, which may be formed to mate with angled surfaces of the spikes 1610 on either end of a row, the clearance slots 1713 may be capable of orienting the device 1603 to the thermoformed mat or tray, and thence to the vehicle foot well for which the mat or tray is intended. This could be particularly important, for example, where slanted spikes or projections are used, as is shown in FIGS. 7A and 7B. For devices having slanted spikes 706 (e.g. FIG. 7A), end surfaces 1715 could be conformably slanted.

Structure 1700 further has one or more vacuum source conduits 1722 that in use are connected a source of vacuum. The vacuum conduits 1722 can communicate with annular vacuum channel 1632 (FIG. 19) and thence to through-holes 1628.

In operation, a device 1603 is fitted to each device receiving structure 1700 in the mold 1704; in one embodiment, there will be two such structures 1700 made for a mold for a passenger's side floor cover. However, devices 1603 may also be furnished for mats or trays that are on the first row driver's side, or for the second or third row mats or trays, or the cargo area, and wherever the corresponding foot wells/cargo area for any of these lack OEM retention devices. A blank of thermoplastic material is heated to softening and is sucked into the mold 1704. Partial vacuum provided at the exits of through-holes 1628, or more generally, urges the soft thermoplastic material into close conformance with the external sidewall surface 1620 of the device knob 1614. Because surface 1620 is undercut, this affixes the device 1603 directly to the cover 1604 without the necessity of furnishing a grommet or cap, and avoids the necessity of making a hole in cover 1604. This prevents any problems associated with fluid leakage from the top of the mat or tray onto the carpet which it is supposed to protect.

Figure 17:
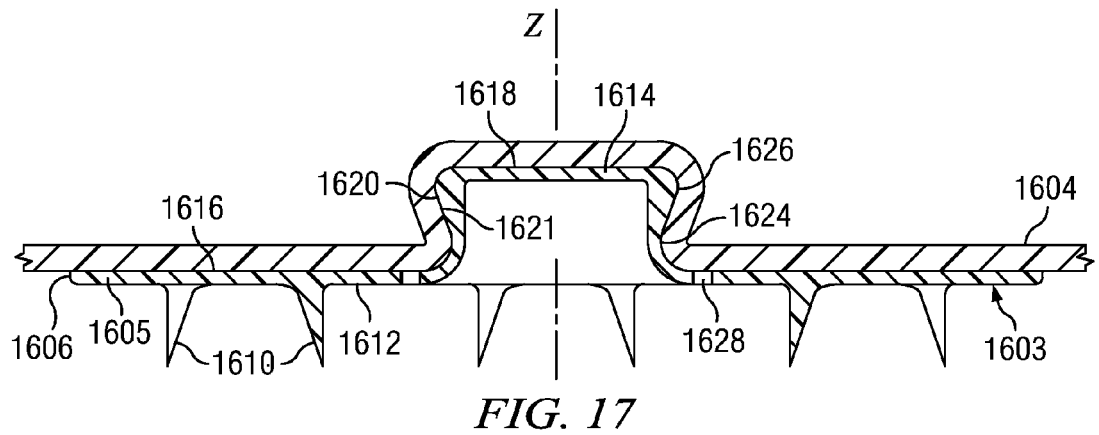
FIG. 17 is a sectional view taken through a vertical axis of the device shown in FIG. 16, after a floor cover has been attached to it by thermoforming.
Figure 18:
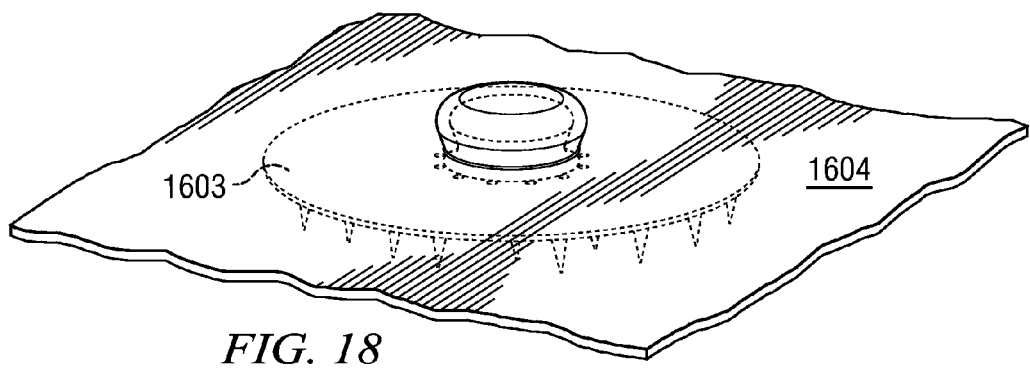
FIG. 18 is a top perspective view of a floor cover equipped with the device shown in FIG. 16, the retention device being shown in hidden line.
Figure 22:
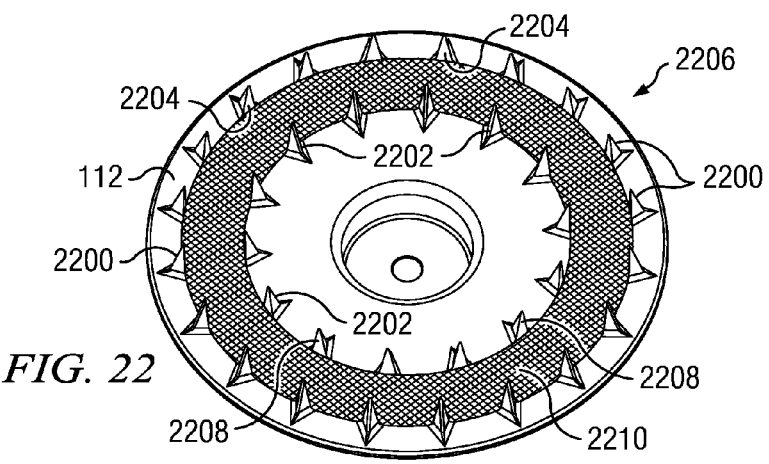
FIG. 22 is a bottom perspective view of an alternative embodiment of the invention featuring annular arrays of projections, and also illustrating a contact footprint of a cylindrical ejector sleeve.

FIG. 22 illustrates an alternative embodiment in which the straight rows of spikes or projections are replaced with an outer annular array 2200 of spikes or projections, and an inner annular array 2202 of spikes or projections. Each of the spikes 2200 has a vertical face 2204 that faces radially inwardly to the center of device 2206. Each of the spikes 2202 has a vertical face 2208 that faces radially outwardly in respect of the center of the device 2206. Each of the vertical faces 2208 conforms to an interior cylindrical wall of an ejector sleeve, a footprint of which his shown at 2210. Each of the vertical faces 2204 likewise conform to an exterior cylindrical wall of the ejector sleeve. The use of the ejector sleeve walls in partially defining the spike cavities permits the sharp definition of the spikes or projections 2200, 2202. The annular spike arrays 2200, 2202 may be used with devices that affix to a top grommet or cap (FIG. 3), devices that affix to a bottom grommet (FIG. 5), or devices that are attached to a mat or tray by a thermoforming operation (FIG. 17).

In summary, the present invention provides an affixation device that allows vehicle floor covers to be attached in various vehicle foot wells. The affixation device has projections that bite into vehicle foot well carpeting and a fastener that is accepted into a top grommet or cap, a bottom grommet, or a floor cover thermoformed around an upstanding knob thereof. The vehicle floor cover is sandwiched in between the grommet and affixation device and can be releasably attached to the vehicle foot well.

While illustrated embodiments of the present invention have been described and illustrated in the appended drawings, the present invention is not limited thereto but only by the scope and spirit of the appended claims.

We claim:

1. A device for fastening a vehicle floor cover to carpeting in a vehicle foot well, the device comprising:
 a body having a first face, a second face opposed to the first face and an axis defined to be perpendicular to the first and second faces;
 a plurality of projections extending from the first face, each projection spaced from adjacent projections, the projections forming a two-dimensional array;
 the projections formed in linear rows and each having a vertical face in alignment with the axis, the vertical faces in any one row being coplanar, the rows including a first row and a second row parallel to and adjacent to the first row, the vertical faces in the first row oriented to face the vertical faces in the second row; and
 a fastener extending from the second face along the axis in opposition to the projections, the fastener sized to be received into a grommet of a vehicle floor cover.

2. The device of claim 1, wherein the body is formed from nylon.

3. The device of claim 1, wherein the projections are spikes.

4. The device of claim 1, wherein each of the plurality of projections has a triangular base.

5. A system for releasably attaching a vehicle floor cover to carpeting in a vehicle foot well, comprising:

a carpet affixation member, the affixation member having a body with a first face, a second face opposed to the first face and an axis formed to be perpendicular to the first face, a plurality of spikes extending downwardly in parallel to the axis from the first face and adapted to penetrate the carpeting, a fastener integrally formed with the body and extending upwardly from the second face;

a vehicle floor cover having an upper surface and a lower surface, a hole formed from the lower surface to the upper surface, the hole adapted to receive the fastener; and a top grommet, an orifice of the top grommet receiving the fastener, the top grommet and affixation member releasably attaching the vehicle floor cover to the carpeting.

6. The system of claim 5, wherein the first fastener includes a mushroom head which snaps into the orifice of the top grommet in order to affix the top grommet to the affixation member.

7. The system of claim 5, wherein the vehicle floor cover has two holes, one fastener received into each of the holes, for each hole a respective top grommet receiving a respective fastener.

8. The system of claim 5, wherein the top grommet is a closed cap that snaps to the fastener.

9. The system of claim 5, wherein said foot well is a passenger's side foot well and said vehicle floor cover is a passenger's side floor cover, the system further including a driver's side vehicle foot well, at least one OEM floor cover affixation device upstanding from a floor of the driver's side vehicle foot well, and a driver's side floor cover, a grommet in the driver's side floor cover receiving the OEM floor cover affixation device.

10. A system for releasably attaching a vehicle floor cover to carpeting in a vehicle foot well, comprising:
 a carpet affixation member, the affixation member having a body with a first face, a second face opposed to the first face and an axis formed at a perpendicular angle to the first face, a plurality of spikes extending downwardly in parallel to the axis from the first face and adapted to penetrate the carpeting, a fastener integrally formed with the body and extending upwardly from the second face;
 a bottom grommet joined to the fastener, a bottom grommet fastener extending upwardly from the bottom grommet;
 a vehicle floor cover having an upper surface and a lower surface, a hole formed from the lower surface to the upper surface, the hole adapted to receive the bottom grommet fastener; and
 a top grommet, an orifice of the top grommet receiving the bottom grommet fastener to releasably attach the vehicle floor cover to the carpeting.

11. The system of claim 10, wherein the first fastener includes a mushroom head which snaps into the orifice of the grommet in order to affix the vehicle floor cover to the carpeting.

12. The system of claim 10, wherein the vehicle floor cover has two holes, one fastener received into each of the holes, a respective top grommet receiving a respective fastener.

13. The system of claim 10, wherein the top grommet is a closed cap that snaps to the fastener.

14. The system of claim 10, wherein said foot well is a passenger's side foot well and said vehicle floor cover is a passenger's side floor cover, the system further including a driver's side vehicle foot well, at least one OEM floor cover affixation device upstanding from a floor of the driver's side vehicle foot well, and a driver's side floor cover, a grommet in the driver's side floor cover receiving the OEM floor cover affixation device.

15. A device for fastening a vehicle floor cover to carpeting in a vehicle foot well, the device comprising:
 a body having a first face, a second face opposed to the first face and an axis defined to be perpendicular to the first and second faces;
 a plurality of projections extending from the first face, each projection spaced from adjacent projections, the projections forming a two-dimensional array, the projections formed in linear rows; and
 a single fastener extending from the second face along the axis in opposition to the projections, the fastener sized to be received in a grommet.

16. The system of claim 15, wherein the fastener includes a mushroom head which snaps into the orifice of the grommet in order to affix the vehicle floor cover to carpeting.

* * * * *